(12) United States Patent
Rosa

(10) Patent No.: US 12,336,505 B2
(45) Date of Patent: Jun. 24, 2025

(54) INVISIBLE PET LEASH ASSEMBLY

(71) Applicant: Priscilla Rosa, Crosby, TX (US)

(72) Inventor: Priscilla Rosa, Crosby, TX (US)

( * ) Notice: Subject to any disclaimer, the term of this patent is extended or adjusted under 35 U.S.C. 154(b) by 0 days.

(21) Appl. No.: 18/229,783

(22) Filed: Aug. 3, 2023

(65) Prior Publication Data

US 2025/0040513 A1    Feb. 6, 2025

(51) Int. Cl.
    *A01K 15/02*      (2006.01)

(52) U.S. Cl.
    CPC .................................. *A01K 15/023* (2013.01)

(58) Field of Classification Search
    CPC ............................ A01K 15/023; A01K 27/009
    See application file for complete search history.

(56) References Cited

U.S. PATENT DOCUMENTS

| | | | | |
|---|---|---|---|---|
| 2,850,711 | A * | 9/1958 | Terlinde | H01R 13/193 439/269.2 |
| 5,353,744 | A * | 10/1994 | Custer | A01K 27/009 119/908 |
| 5,601,054 | A * | 2/1997 | So | A01K 27/009 119/908 |
| 7,179,110 | B1 * | 2/2007 | Huang | H01R 13/6395 439/381 |
| 8,260,431 | B2 | 9/2012 | Kim | |
| 9,449,487 | B1 * | 9/2016 | Spitalny | G08B 21/0261 |
| 9,801,356 | B2 | 10/2017 | Bianchi | |
| D858,904 | S | 9/2019 | Zinn | |
| 2012/0192811 | A1 * | 8/2012 | Robinson | A01K 27/001 119/862 |
| 2015/0075446 | A1 * | 3/2015 | Hu | A01K 15/023 119/718 |
| 2018/0055010 | A1 | 3/2018 | Oostdik | |
| 2018/0184618 | A1 | 7/2018 | Gotts | |
| 2022/0201977 | A1 | 6/2022 | Bland | |
| 2022/0346354 | A1 | 11/2022 | Maganzini | |
| 2023/0140858 | A1 * | 5/2023 | Van Curen | A01K 29/005 119/712 |
| 2024/0041006 | A1 * | 2/2024 | Gordon | A01K 27/009 |

FOREIGN PATENT DOCUMENTS

WO    WO09933039    7/1999

\* cited by examiner

*Primary Examiner* — Christopher D Hutchens
*Assistant Examiner* — Nevena Aleksic

(57) ABSTRACT

An invisible pet leash assembly for facilitating a user to control a domesticated animal without a leash includes a shock collar that is wearable around a neck of a domesticated animal. The shock collar has a pair of prongs each is removably attachable to the shock collar each in physical contact with the domesticated anima. The shock collar has a communication unit which broadcasts a tracking signal when the shock collar is turned on. A personal electronic device is carried by a user and the personal electronic device is in remote communication with the shock collar. The shock collar delivers an alert signal to the pair of prongs when the shock collar receives an alert command to alert the domesticated animal to move toward the user.

8 Claims, 6 Drawing Sheets

INVISIBLE PET LEASH ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to invisible leash devices and more particularly pertains to a new invisible leash device for facilitating a user to control a domesticated animal without a leash. The device includes a shock collar and a pair of prongs that are removably attachable to the shock collar and an alert unit integrated into the shock collar that transmits and alert signal to the pair of prongs. The device includes a personal electrical device that is in wireless communication with the shock collar and which broadcasts an alert command to the shock collar when the personal electronic device determines that the shock collar has moved a beyond a pre-determined distance from the personal electronic device.

(2) Description of Related Art Including Information Disclosed Under 37 CFR 1.97 and 1.98

The prior art relates to invisible leash devices including a variety of invisible leash devices that includes a shock collar that can be worn on a domesticated animal and a personal electronic device carried by a user which activates the shock collar when the shock collar moves beyond a pre-determined distance from the shock collar. Additionally, the prior art discloses a plurality of invisible leash devices that includes wireless communication between a personal electronic device, an extrinsic communication network and a shock collar. In no instance does the prior art disclose an invisible leash device that includes a personal electronic device in wireless communication with a shock collar that includes a pair of prongs that are removably attachable to the shock collar for either delivering a vibration alert to a domesticated animal or an electrical shock alert to the domesticated animal when the domesticated animal moves beyond a pre-determined distance from the personal electronic device.

BRIEF SUMMARY OF THE INVENTION

An embodiment of the disclosure meets the needs presented above by generally comprising a shock collar that is wearable around a neck of a domesticated animal. The shock collar has a pair of prongs each is removably attachable to the shock collar each in physical contact with the domesticated anima. The shock collar has a communication unit which broadcasts a tracking signal when the shock collar is turned on. A personal electronic device is carried by a user and the personal electronic device is in remote communication with the shock collar. The shock collar delivers an alert signal to the pair of prongs when the shock collar receives an alert command to alert the domesticated animal to move toward the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
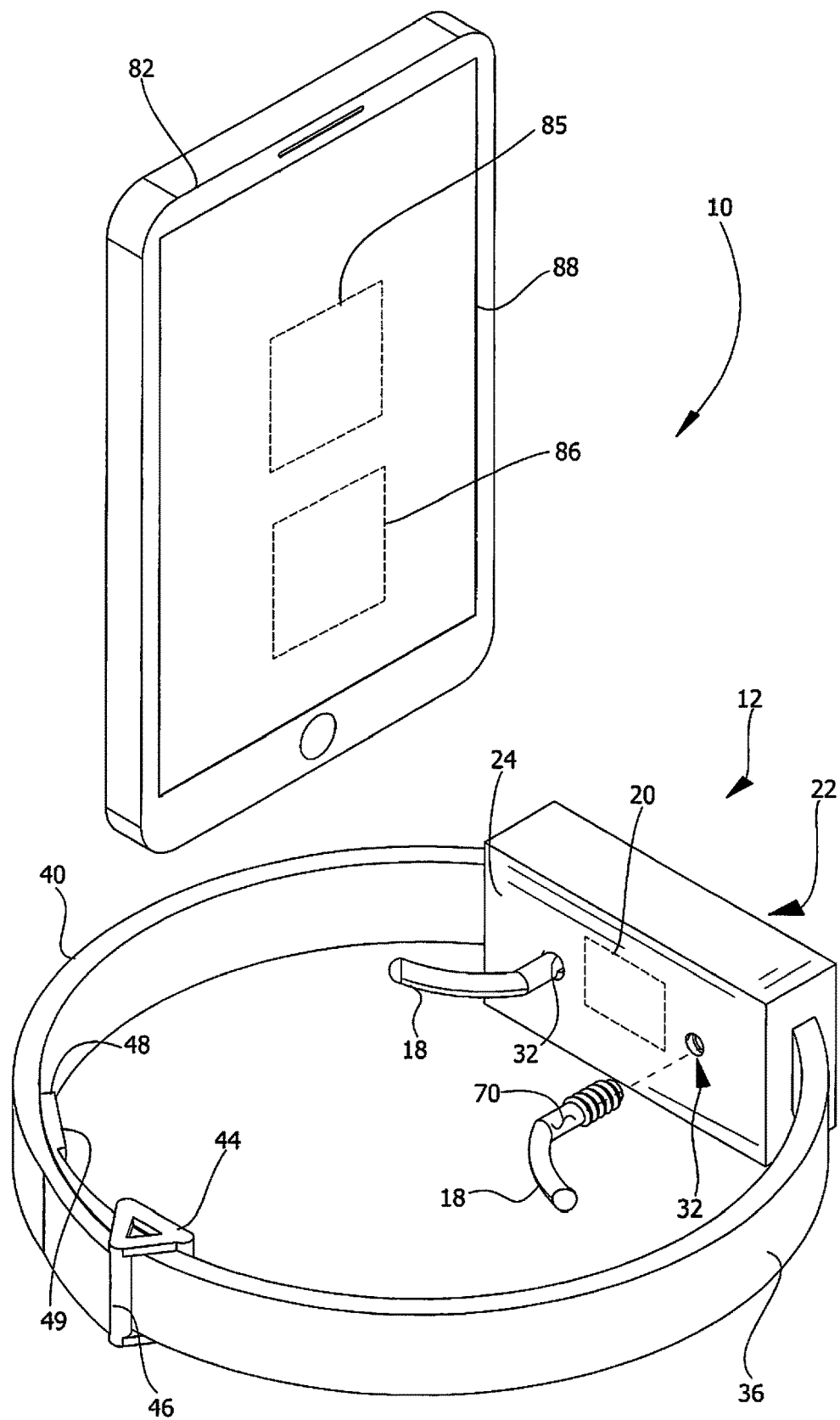
FIG. 1 is a perspective view of an invisible pet leash assembly according to an embodiment of the disclosure.
Figure 2:
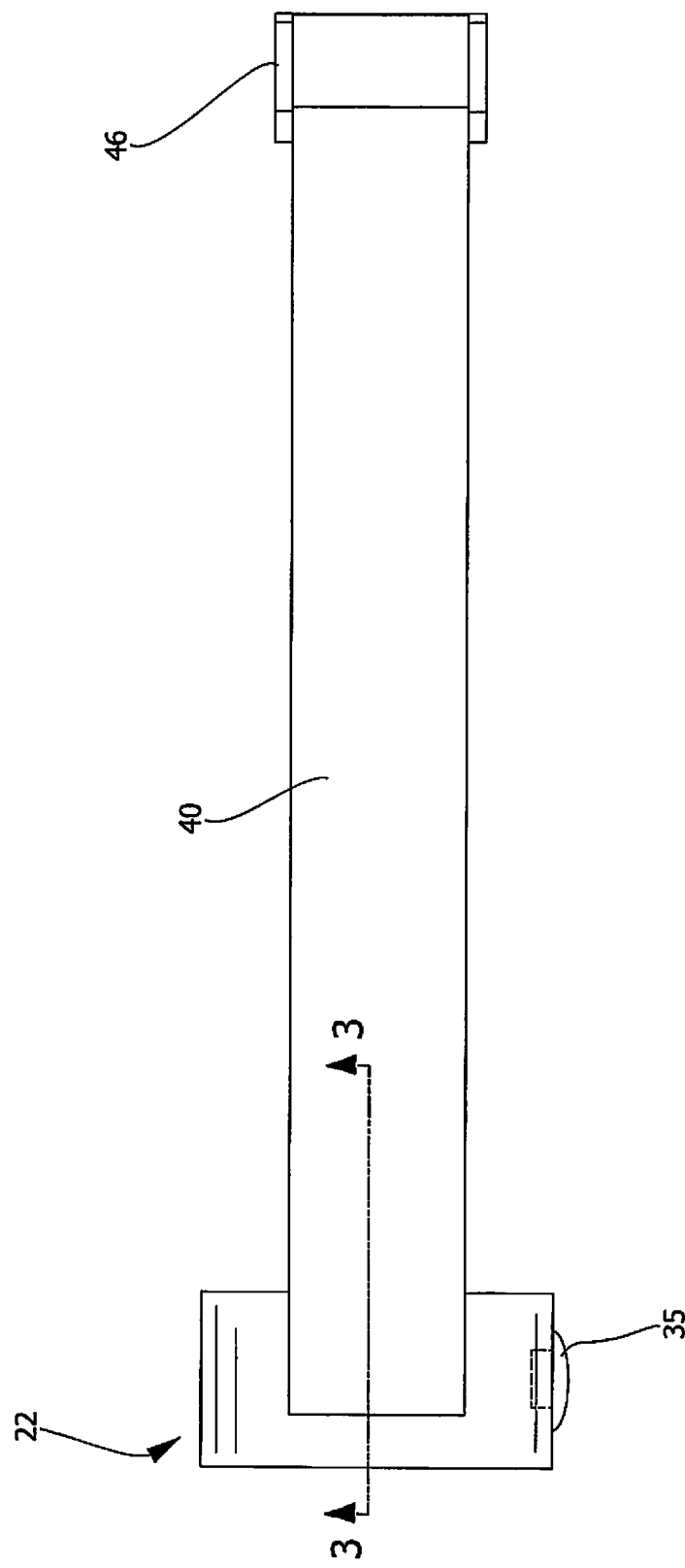
FIG. 2 is a back view of an embodiment of the disclosure.
Figure 3:
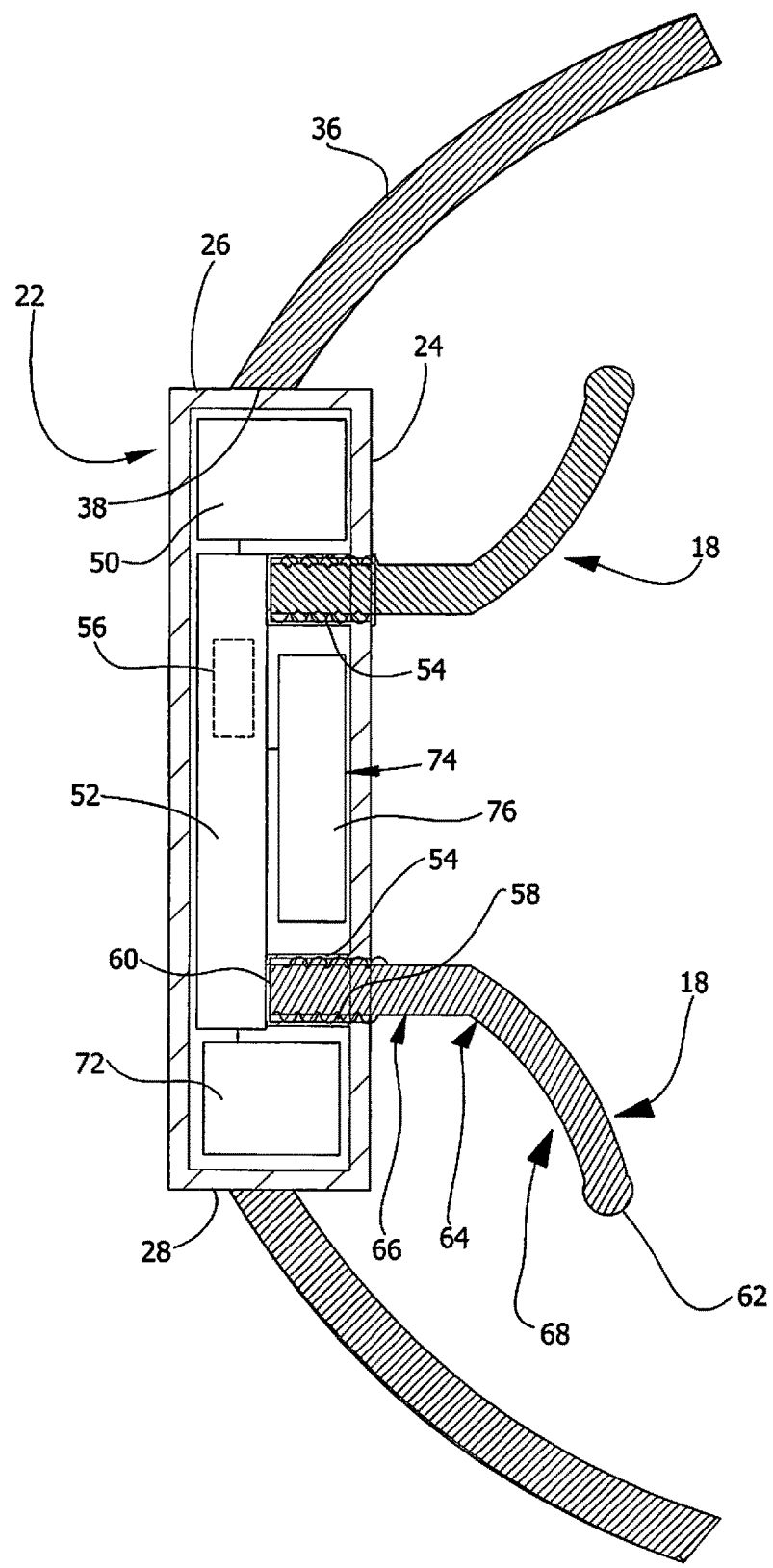
FIG. 3 is a cross sectional view taken along line 3-3 of FIG. 2 of an embodiment of the disclosure.

With reference now to the drawings, and in particular to FIGS. 1 through 6 thereof, a new invisible leash device embodying the principles and concepts of an embodiment of the disclosure and generally designated by the reference numeral 10 will be described.

As best illustrated in FIGS. 1 through 6, the invisible pet leash assembly 10 generally comprises a shock collar 12 that is wearable around a neck 14 of a domesticated animal 16. The shock collar 12 has a pair of prongs 18 that is each removably attachable to the shock collar 12. Furthermore, each of the prongs 18 is in physical contact with the domesticated animal 16 when the shock collar 12 is worn on the domesticated animal's neck 14. The domesticated animal 16 may be a canine of any breed that is kept as a pet.

A communication unit 20 is integrated into the shock collar 12 and the communication unit 20 broadcasts a tracking signal when the shock collar 12 is turned on.

The shock collar 12 comprises a housing 22 which has a rear wall 24, a first lateral wall 26, a second lateral wall 28 and a bottom wall 30. The rear wall 24 has a pair of prong holes 32 each extending into an interior of the housing 22 and the pair of prong holes 32 are spaced apart from each other and are distributed along an axis extending between the first lateral wall 26 and the second lateral wall 28. The bottom wall 30 has a charging hole 34 extending into the interior of the housing 22 and the charging hole 34 is centrally positioned on the bottom wall 30. A cover 35 is removably insertable into the charging hole 34 for closing the charging hole 34 and the cover 36 may form a fluid impermeable seal with the housing 22 for inhibiting moisture from entering the housing 22.

Figure 4:
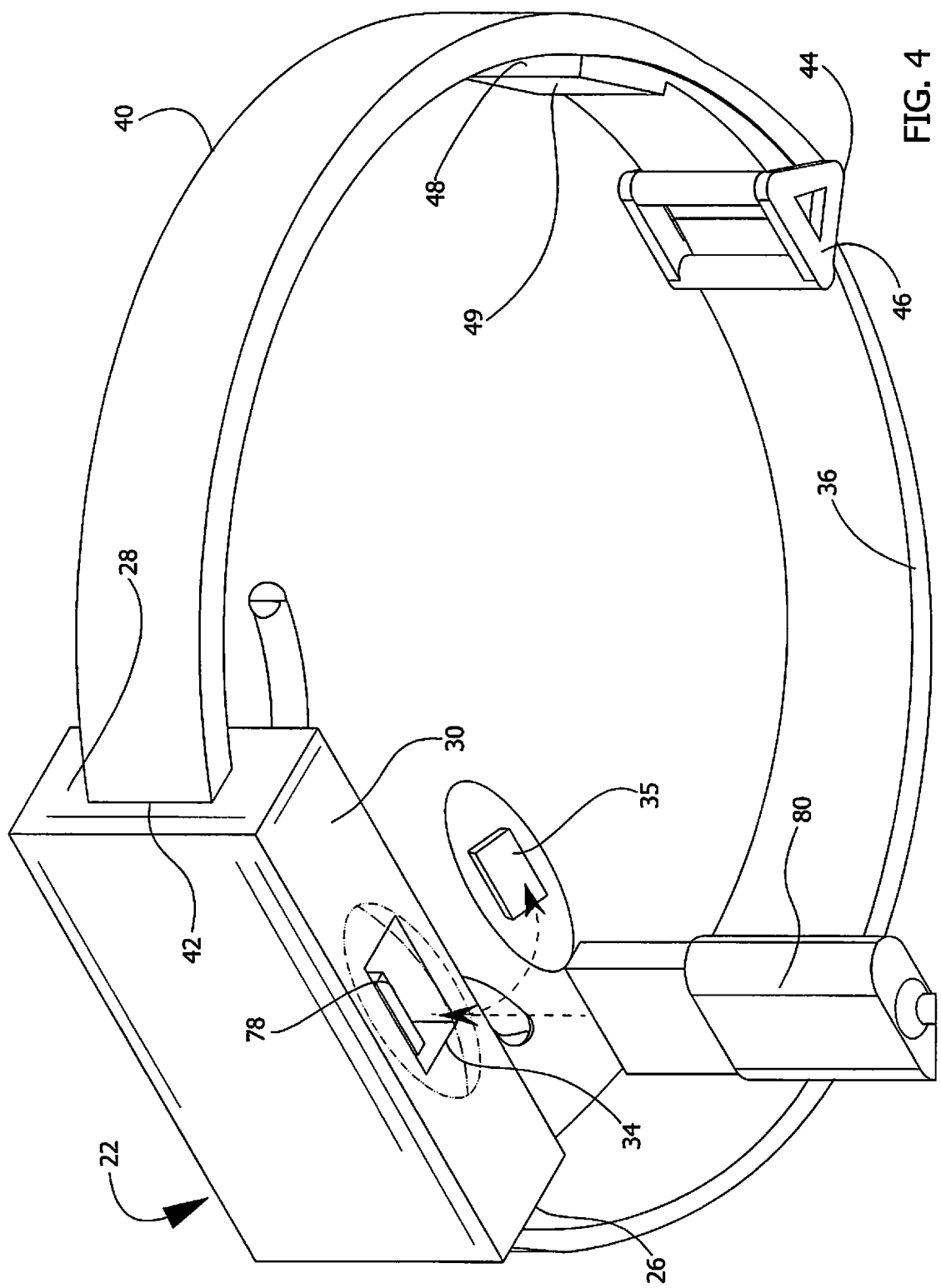
FIG. 4 is a bottom perspective view of an embodiment of the disclosure.
Figure 5:
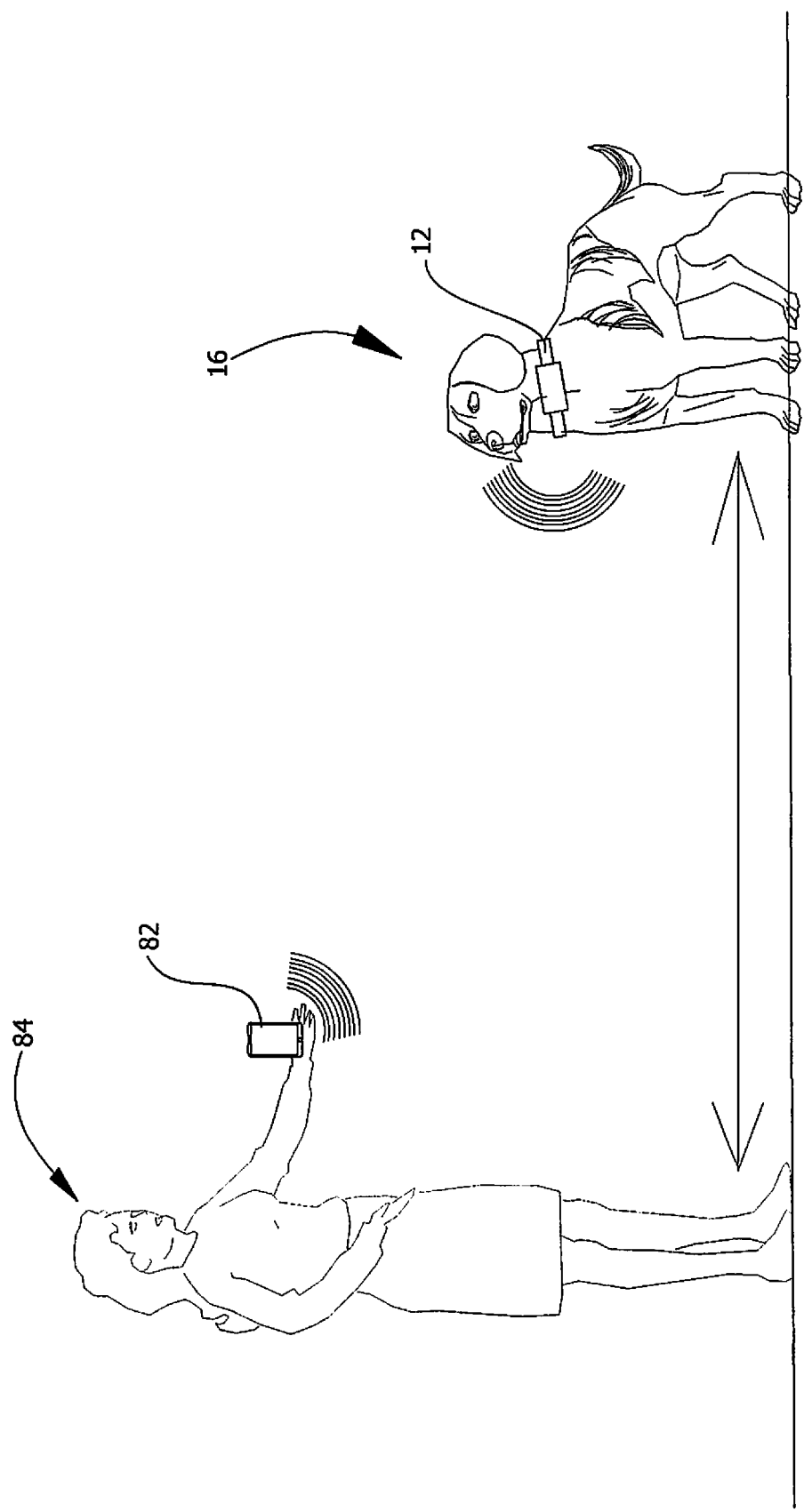
FIG. 5 is a perspective in-use view of an embodiment of the disclosure.
Figure 6:
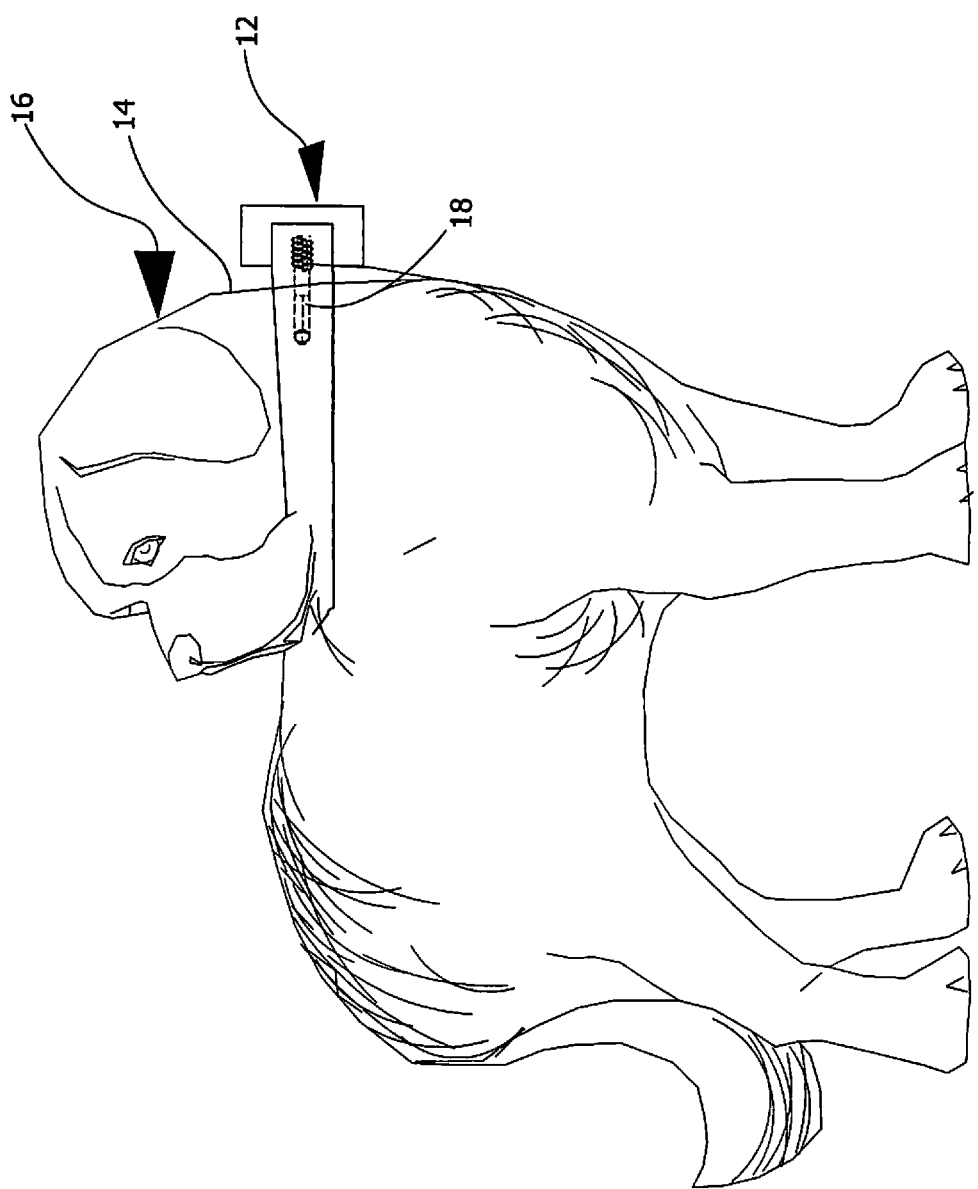
FIG. 6 is an in-use view of an embodiment of the disclosure.

The shock collar 12 includes a first strap 36 that has a coupled end 38 which is coupled to the first lateral wall 26 of the housing 22 and a second strap 40 that has a coupled end 42 which is coupled to the second lateral wall 28 of the housing 22. A clasp 44 is coupled to a free end 46 of the second strap 40 and a free end 48 of the first strap 36 is extendable through the clasp 44 thereby forming the first strap 36 and the second strap 40 into a closed loop. Additionally, the rear wall 24 of the housing 22 is directed into the closed loop formed by the first strap 36 and the second strap 40. In this way the first strap 36 and the second strap 40 can be worn around the domesticated animal's neck 14 having the rear wall 24 of the housing 22 being directed toward the domesticated animal's neck 14. As is shown in FIGS. 1 and 4, the first strap 36 may have a prominence 49 located adjacent to the free end 48 of the first strap 36 for inhibiting the free end 48 of the first strap 36 from being removed from the clasp 44.

The shock collar 12 includes a processor 50 that is integrated into the housing 22 and the processor 50 receives an alert input. The shock collar 12 includes an alert unit 52 that is integrated into the housing 22. The alert unit 52 has a pair of tubes 54 each is aligned with a respective one of the prong holes 32 thereby facilitating each of the pair of prongs 18 to be inserted into a respective one of the pair of prong holes 32 and subsequently extend into a respective one of the tubes 54. The alert unit 52 includes a vibration device 56 that may include a motor and a cam which is rotated by the motor on an offset axis to impart vibration into each of the pair of tubes 54.

Each of the tubes 54 has an interior surface 58 that is threaded and each of the pair of prongs 18 has a first end 60 and a second end 62. Each of prongs 18 has a bend 64 positioned between the first end 60 and the second end 62 to define a first portion 66 of the prongs 18 forming an angle with a second portion 68 of the prongs 18. The first end 60 is associated with the first portion 66 and the second end 62 is associated with the second end 62. An outside surface 70 corresponding to the first portion 66 of each of the pair of prongs 18 is threaded adjacent to the first end 60. The first end 60 of each of the pair of prongs 18 is insertable into a respective one of the pair of prong holes 32 thereby facilitating each of the pair of prongs 18 to threadably engage the interior surface 54 of the respective tube 54.

Each of the pair of tubes 54 is comprised of an electrically conductive material and each of the pair of prongs 18 is comprised of an electrically conductive material. In this way each of the pair of prongs 18 is placed in electrical communication with the respective tube 54. The alert unit 52 is electrically coupled to the processor 50 and the alert unit 52 is actuatable into a first condition or a second condition when the processor 50 receives the alert input. The alert unit 52 vibrates each of the pair of tubes 54 when the alert unit 52 is actuated into the first condition such that each of the pair of tubes 54 vibrates the respective prong 18. In this way each of the pair of prongs 18 vibrates against the domesticated animal's neck 14 for alerting the domesticated animal 16.

Each of the pair of prongs 18 receives an electrical charge when the alert unit 52 is actuated into the second condition. In this way each of the pair of prongs 18 delivers an electrical shock to the domesticated animal 16 for alerting the domesticated animal 16. the second portion 68 of each of the pair of prongs 18 angles away from each other when each of the pair of prongs 18 is attached to the respective tube 54. Additionally, as is most clearly shown in FIG. 3, the second end 62 of each of the pair of prongs 18 is rounded. The shock collar 12 includes a transceiver 72 that is integrated into the housing 22 such that the transceiver 72 defines the communication unit 20. The transceiver 72 is electrically coupled to the processor 50 and the transceiver 72 continuously broadcasts the tracking signal when the processor 50 is turned on. The transceiver 72 may comprise a radio frequency transceiver 72 or the like and the transceiver 72 may employ Bluetooth communication protocols.

The shock collar 12 includes a power supply 74 that is integrated into the housing 22 and the power supply 74 is electrically coupled to the processor 50. The power supply 74 comprises a rechargeable battery 76 that is positioned within the housing 22 and the rechargeable battery 76 is electrically coupled to the processor 50. The power supply 74 includes a charge port 78 that is positioned in the charging hole 34 in the bottom wall 30 of the housing 22 such that the charge port 78 can receive a charge cord 80. The charge port 78 is electrically coupled to the rechargeable battery 76 for charging the rechargeable battery 76. The charge port 78 may comprise a mini universal serial bus port, a C-type charge port or any other type of charge port commonly found on rechargeable electronic devices.

A personal electronic device 82 is included which is carried by a user 84 who is the caretaker for the domesticated animal 16. The personal electronic device 82 has wireless communication capabilities thereby facilitating the personal electronic device 82 to be in remote communication with the shock collar 12. Furthermore, the personal electronic device 82 receives the tracking signal thereby facilitating the personal electronic device 82 to analyze the tracking signal for determining a distance between the personal electronic device 82 and the shock collar 12. The personal electronic device 82 stores data comprising a control program 85 and the control program 85 may comprise a smart phone application. The control program 85 may include features to facilitate the user 84 to set a predetermined distance that the shock collar 12 is permitted to move away from the personal electronic device 82, which may range between approximately 1.0 meter and 3.0 meters. Furthermore, the control program 85 may facilitate the intensity of either the vibration or the electric shock to be adjusted between a minimum intensity and a maximum intensity.

The personal electronic device 82 broadcasts an alert command to the shock collar 12 when the personal electronic device 82 determines that the shock collar 12 has moved beyond the predetermined distance from the personal electronic device 82. Furthermore, the shock collar 12 delivers an alert signal to the pair of prongs 18 when the shock collar 12 receives the alert command. In this way the shock collar 12 can alert the domesticated animal 16 to move toward the user 84.

The personal electronic device 82 includes a transceiver 86 and a display 88 and the transceiver 86 associated with the personal electronic device 82 is in wireless communication with the transceiver 72 associated with the shock collar 12. The transceiver 86 associated with the personal electronic device 82 receives the tracking signal thereby facilitating the control program 85 to analyze the tracking signal. The transceiver 86 associated with the personal electronic device 82 broadcasts the alert command to the transceiver 72 associated with the shock collar 12 when the control program 85 determines that the tracking signal has fallen below a pre-determined signal strength. The transceiver 86 associated with the personal electronic device 82 may comprise a radio frequency transceiver or the like and the transceiver 86 associated with the personal electronic device 82 may employ Bluetooth communication protocols.

In use, the shock collar 12 is positioned around the domesticated animal's neck 14 and the personal electronic device 82 is synchronized with communication unit 20 in the shock collar 12. The pre-determined distance is established with the control program 85 and the user 84 takes the domesticated animal 16 for a walk. Additionally, the control program 85 is manipulated to select either a vibration alert or a shock alert to be delivered by the alert unit 52. The shock collar 12 delivers either the vibration alert or the shock alert when the control program 85 determines that the shock collar 12 has moved beyond the pre-determined distance from the personal electronic device 82. In this way the domesticated animal 16 is alerted to move toward the user 84 while the user 84 is walking the domesticated animal 16. Thus, the user 84 can retain control of the domesticated animal 16 without the use of a leash thereby eliminating the possibility of tangles, being pulled by the domesticated animal 16 and other problems that can arise with the use of a leash while walking the domesticated animal 16. The shock collar 12 can be employed without the pair of prongs 18 when the shock collar 12 is set to deliver the vibration alert rather than the shock alert.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An invisible pet leash system for inhibiting a pet from moving beyond a pre-determined distance from a user, said system comprising:
   a shock collar being configured to be wearable around a neck of a domesticated animal, said shock collar having a pair of prongs each being removably attachable to said shock collar wherein each of said prongs is configured to be in physical contact with the domesticated animal when said shock collar is worn on the domesticated animal's neck, said shock collar having a communication unit being integrated into said shock collar, said communication unit broadcasting a tracking signal when said shock collar is turned on;
   a personal electronic device being configured to be carried by a user, said personal electronic device having wireless communication capabilities thereby facilitating said personal electronic device to be in remote communication with said shock collar such that said personal electronic device receives said tracking signal thereby facilitating said personal electronic device to analyze said tracking signal for determining a distance between said personal electronic device and said shock collar, said personal electronic device storing data comprising a control program, said personal electronic device broadcasting an alert command to said shock collar when said personal electronic device determines that said shock collar has moved beyond a predetermined distance from said personal electronic device, said shock collar delivering an alert signal to said pair of prongs when said shock collar receives said alert command wherein said shock collar is configured to alert the domesticated animal to move toward the user;
   wherein said shock collar comprises a housing having a rear wall and a first lateral wall and a second lateral wall and a bottom wall;
   wherein said rear wall having a pair of prong holes each extending into an interior of said housing, said pair of prong holes being spaced apart from each other and being distributed along an axis extending between said first lateral wall and said second lateral wall;
   wherein said bottom wall has a charging hole extending into said interior of said housing, said charging hole being centrally positioned on said bottom wall;
   wherein each of said pair of prongs has a first end and a second end; and
   wherein each of said prongs has a bend positioned between said first end and said second end to define a first portion of said prongs forming an angle with a second portion of said prongs, said first end being associated with said first portion, said second end being associated with said second end; and
   said second portion of each said prong being arcuate such that a convex surface of said second portion of said prong is configured to face and contact the domesticated animal's neck.

2. The system according to claim 1, wherein said shock collar includes:
   a first strap having a coupled end being coupled to said first lateral wall of said housing;
   a second strap having a coupled end being coupled to said second lateral wall of said housing; and
   a clasp being coupled to a free end of said second strap, a free end of said first strap being extendable through said clasp thereby forming said first strap and said second strap into a closed loop having said rear wall of said housing being directed into said closed loop formed by said first strap and said second strap wherein said first strap and said second strap are configured to be worn around the domesticated animal's neck having said rear wall of said housing being directed toward the domesticated animal's neck.

3. The system according to claim 1, wherein;
an outside surface corresponding to said first portion of each of said pair of prongs is threaded adjacent to said first end;
said first end of each of said pair of prongs is insertable into a respective one of said pair of prong holes thereby facilitating each of said pair of prongs to threadably engage said interior surface of said respective tube;
said second portion of each of said pair of prongs angles away from each other when each of said pair of prongs is attached to said respective tube; and
said second end of each of said pair of prongs is rounded.

4. The system according to claim 1, wherein said shock collar includes:
a processor being integrated into said housing, said processor receiving an alert input;
a transceiver being integrated into said housing such that said transceiver defines said communication unit, said transceiver being electrically coupled to said processor, said transceiver continuously broadcasting said tracking signal when said processor is turned on;
an alert unit being integrated into said housing, said alert unit having a pair of tubes each being aligned with a respective one of said prong holes thereby facilitating each of said pair of prongs to be inserted into a respective one of said pair of prong holes and subsequently extend into a respective one of said tubes, each of said tubes having an interior surface being threaded;
said alert unit is electrically coupled to said processor, said alert unit being actuatable into a first condition or a second condition when said processor receives said alert input; and
said alert unit vibrates each of said pair of tubes when said alert unit is actuated into said first condition such that each of said pair of tubes vibrates said respective prong wherein each of said pair of prongs is configured to vibrate against the domesticated animal's neck for alerting the domesticated animal.

5. The system according to claim 4, wherein:
each of said pair of tubes is comprised of an electrically conductive material;
each of said pair of prongs is comprised of an electrically conductive material thereby facilitating each of said pair of prongs to be in electrical communication with said respective tube; and
each of said pair of prongs receives an electrical charge when said alert unit is actuated into said second condition wherein each of said pair of prongs is configured to deliver an electrical shock to the domesticated animal for alerting the domesticated animal.

6. The system according to claim 1, wherein:
said shock collar includes a processor; and
said shock collar includes a power supply being integrated into said housing, said power supply being electrically coupled to said processor, said power supply comprising:
a rechargeable battery being positioned within said housing, said rechargeable battery being electrically coupled to said processor; and
a charge port being positioned in said charge hole in said bottom wall of said housing wherein said charge port is configured to receive a charge cord, said charge port being electrically coupled to said rechargeable battery for charging said rechargeable battery.

7. The system according to claim 4, wherein said personal electronic device includes a transceiver and a display, said transceiver associated with said personal electronic device being in wireless communication with said transceiver associated with said shock collar, said transceiver associated with said personal electronic device receiving said tracking signal thereby facilitating said control program to analyze said tracking signal, said transceiver associated with said personal electronic device broadcasting said alert command to said transceiver associated with said shock collar when said control program determines that said tracking signal has fallen below a pre-determined signal strength.

8. An invisible pet leash system for inhibiting a pet from moving beyond a pre-determined distance from a user, said system comprising:
a shock collar being configured to be wearable around a neck of a domesticated animal, said shock collar having a pair of prongs each being removably attachable to said shock collar wherein each of said prongs is configured to be in physical contact with the domesticated animal when said shock collar is worn on the domesticated animal's neck, said shock collar having a communication unit being integrated into said shock collar, said communication unit broadcasting a tracking signal when said shock collar is turned on, said shock collar comprising:
a housing having a rear wall and a first lateral wall and a second lateral wall and a bottom wall, said rear wall having a pair of prong holes each extending into an interior of said housing, said pair of prong holes being spaced apart from each other and being distributed along an axis extending between said first lateral wall and said second lateral wall, said bottom wall having a charging hole extending into said interior of said housing, said charging hole being centrally positioned on said bottom wall;
a first strap having a coupled end being coupled to said first lateral wall of said housing;
a second strap having a coupled end being coupled to said second lateral wall of said housing;
a clasp being coupled to a free end of said second strap, a free end of said first strap being extendable through said clasp thereby forming said first strap and said second strap into a closed loop having said rear wall of said housing being directed into said closed loop formed by said first strap and said second strap wherein said first strap and said second strap are configured to be worn around the domesticated animal's neck having said rear wall of said housing being directed toward the domesticated animal's neck;
a processor being integrated into said housing, said processor receiving an alert input;
an alert unit being integrated into said housing, said alert unit having a pair of tubes each being aligned with a respective one of said prong holes thereby facilitating each of said pair of prongs to be inserted into a respective one of said pair of prong holes and subsequently extend into a respective one of said tubes, each of said tubes having an interior surface being threaded, each of said pair of prongs having a first end and a second end, each of prongs having a bend positioned between said first end and said second end to define a first portion of said prongs forming an angle with a second portion of said prongs, said second portion of each said prong being arcuate such that a convex surface of said second portion of said prong is configured to face and contact the domesticated animal's neck, said first end being associated with said first portion, said second end being associated with said second end, an outside surface corresponding to said first portion of each of said pair of prongs being threaded adjacent to said first end, said first end of each of said pair of prongs being insertable into a respective one of said pair of prong holes thereby facilitating each of said pair of prongs to threadably engage said interior surface of said respective tube, each of said pair of tubes being comprised of an electrically conductive material, each of said pair of prongs being comprised of an electrically conductive material thereby facilitating each of said pair of prongs to be in electrical communication with said respective tube, said alert unit being electrically coupled to said processor, said alert unit being actuatable into a first condition or a second condition when said processor receives said alert input, said alert unit vibrating each of said pair of tubes when said alert unit is actuated into said first condition such that each of said pair of tubes vibrates said respective prong wherein each of said pair of prongs is configured to vibrate against the domesticated animal's neck for alerting the domesticated animal, each of said pair of prongs receiving an electrical charge when said alert unit is actuated into said second condition wherein each of said pair of prongs is configured to deliver an electrical shock to the domesticated animal for alerting the domesticated animal, said second portion of each of said pair of prongs angling away from each other when each of said pair of prongs is attached to said respective tube, said second end of each of said pair of prongs being rounded;

a transceiver being integrated into said housing such that said transceiver defines said communication unit, said transceiver being electrically coupled to said processor, said transceiver continuously broadcasting said tracking signal when said processor is turned on; and a power supply being integrated into said housing, said power supply being electrically coupled to said processor, said power supply comprising:

a rechargeable battery being positioned within said housing, said rechargeable battery being electrically coupled to said processor; and a charge port being positioned in said charge hole in said bottom wall of said housing wherein said charge port is configured to receive a charge cord, said charge port being electrically coupled to said rechargeable battery for charging said rechargeable battery; and a personal electronic device being configured to be carried by a user, said personal electronic device having wireless communication capabilities thereby facilitating said personal electronic device to be in remote communication with said shock collar such that said personal electronic device receives said tracking signal thereby facilitating said personal electronic device to analyze said tracking signal for determining a distance between said personal electronic device and said shock collar, said personal electronic device storing data comprising a control program, said personal electronic device broadcasting an alert command to said shock collar when said personal electronic device determines that said shock collar has moved beyond a predetermined distance from said personal electronic device, said shock collar delivering an alert signal to said pair of prongs when said shock collar receives said alert command wherein said shock collar is configured to alert the domesticated animal to move toward the user, said personal electronic device including a transceiver and a display, said transceiver associated with said personal electronic device being in wireless communication with said transceiver associated with said shock collar, said transceiver associated with said personal electronic device receiving said tracking signal thereby facilitating said control program to analyze said tracking signal, said transceiver associated with said personal electronic device broadcasting said alert command to said transceiver associated with said shock collar when said control program determines that said tracking signal has fallen below a pre-determined signal strength.

* * * * *